United States Patent

[11] 3,614,215

[72] Inventor Leo Mackta
 444 Beach 132nd St., Belle Harbor, N.Y.
[21] Appl. No. 31,234
[22] Filed Apr. 23, 1970
[45] Patented Oct. 19, 1971

[54] FLUID BIFOCAL SPECTACLE
 2 Claims, 8 Drawing Figs.
[52] U.S. Cl. .................................................. 351/41,
 351/159, 351/168, 350/179
[51] Int. Cl. ...................................................... G02c 7/06,
 G02b 3/14
[50] Field of Search ........................................... 351/41,
 159, 168; 350/179, 180

[56] References Cited
UNITED STATES PATENTS
2,437,642 3/1948 Henroteau .................... 351/41

FOREIGN PATENTS
90,267 4/1961 Denmark ..................... 351/41

Primary Examiner—David H. Rubin
Attorney—Lilling & Siegel

ABSTRACT: A bifocal spectacle having a composite split lens with a fluid compartment therein for receiving a refractive fluid, whereby the lens will have a first focal length when the fluid compartment is filled with the fluid and a second focal length when the compartment is empty. Fluid reservoir means are provided in communication with the fluid compartment in such a manner that the fluid will automatically flow from the reservoir to the compartment under the influence of gravity when the spectacle is tilted downwardly and forwardly, as for close reading, and will return to the reservoir when the spectacle is returned to its normal, substantially horizontal position. Gravity-operated piston means may be provided for enhancing the flow of fluid responsive to a slight tilting of the spectacle.

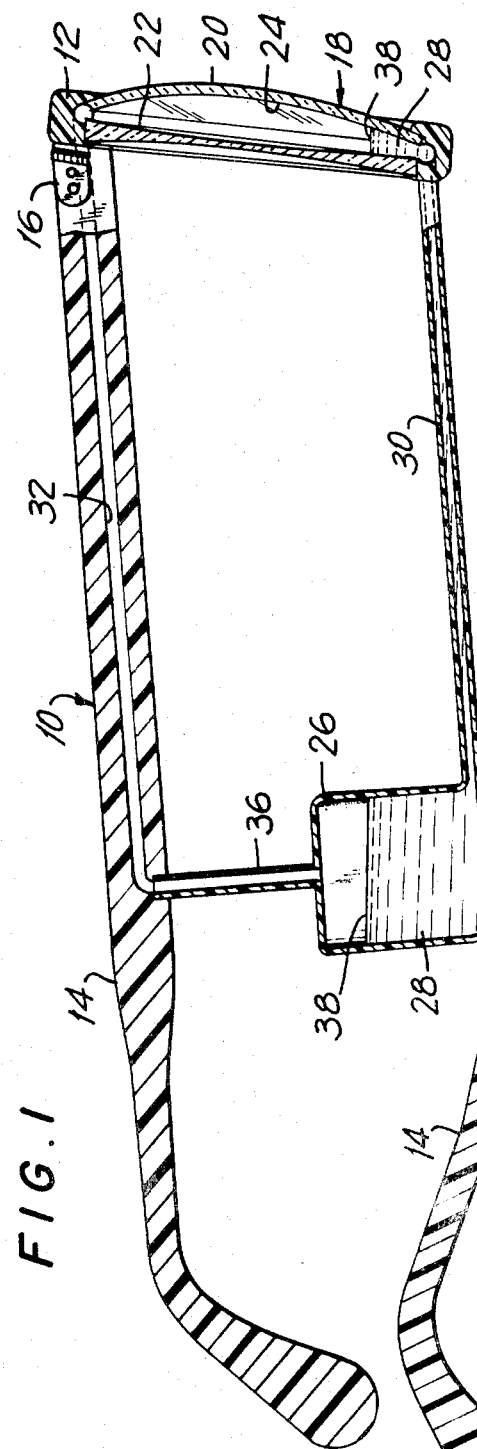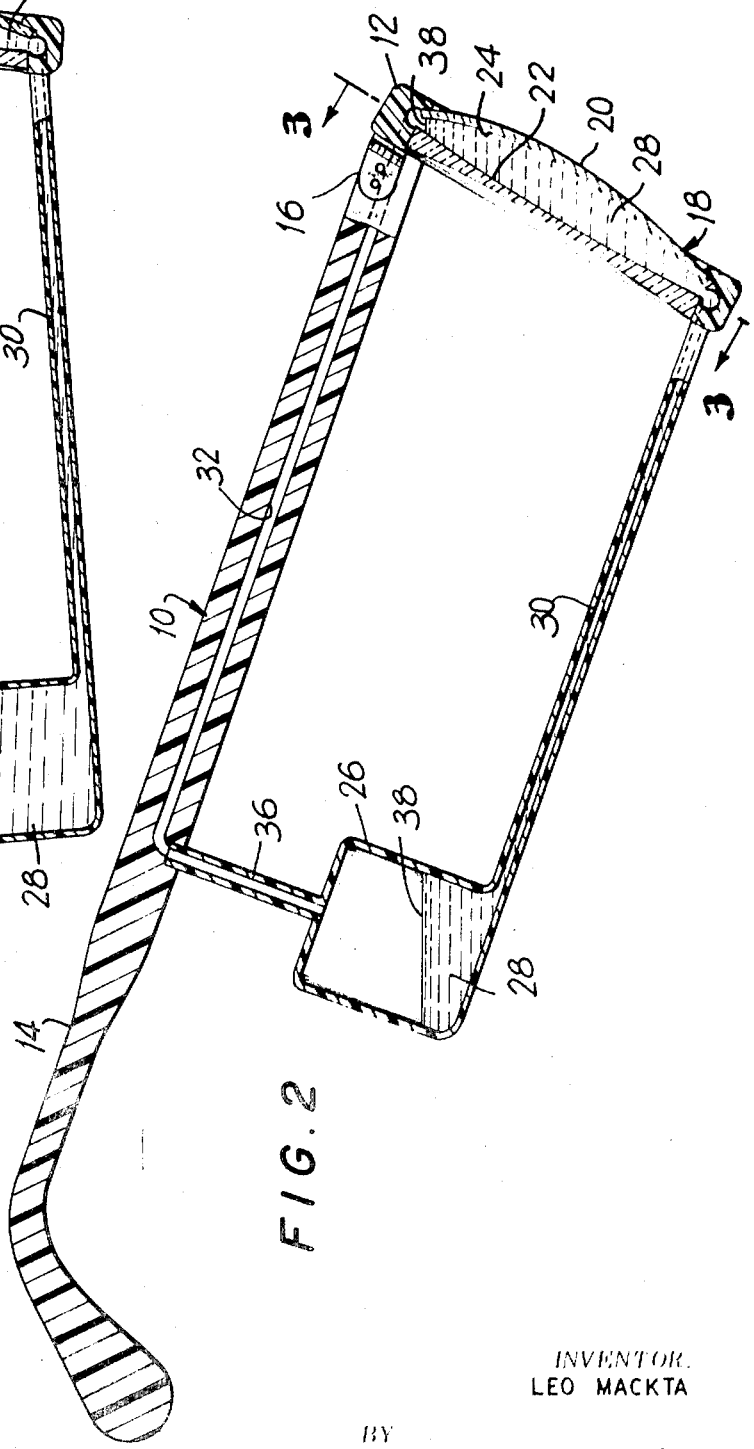

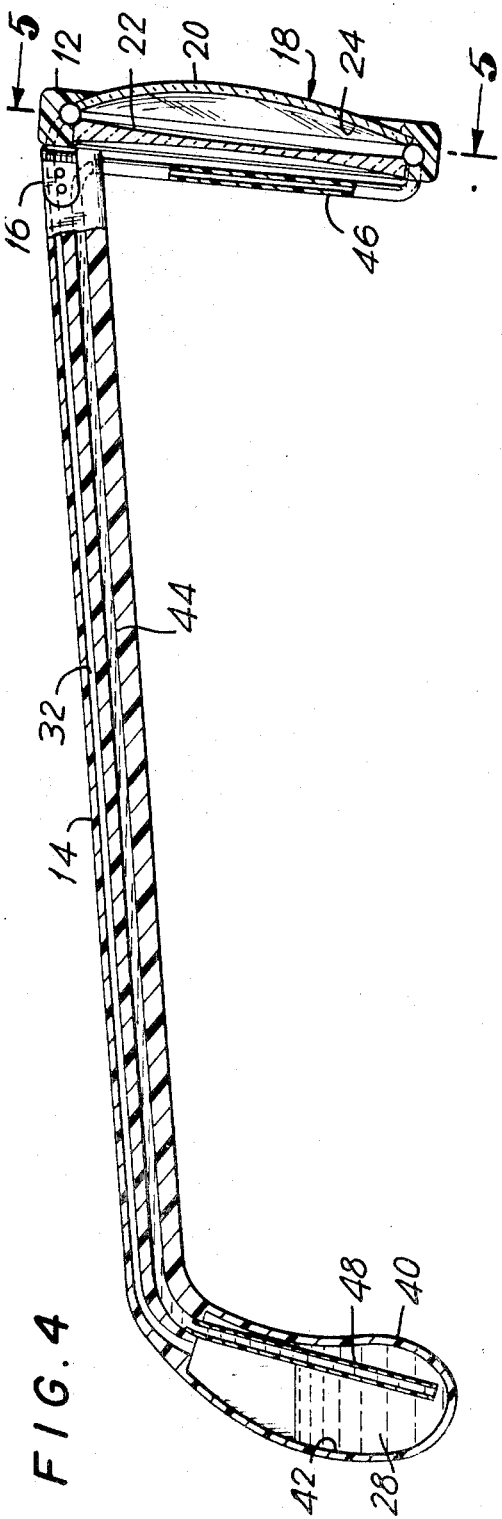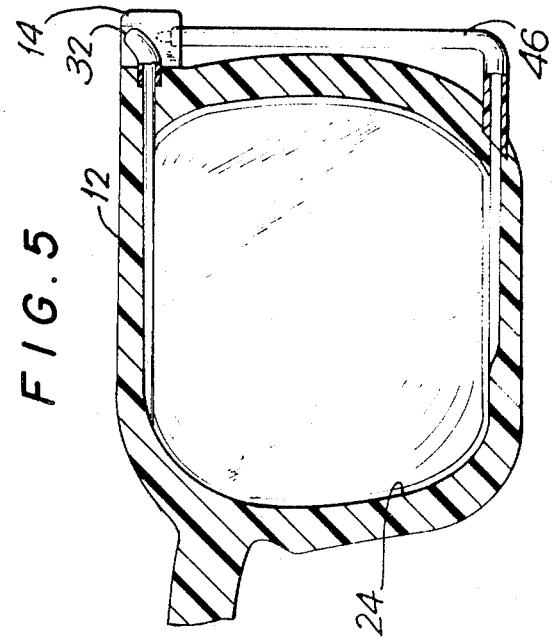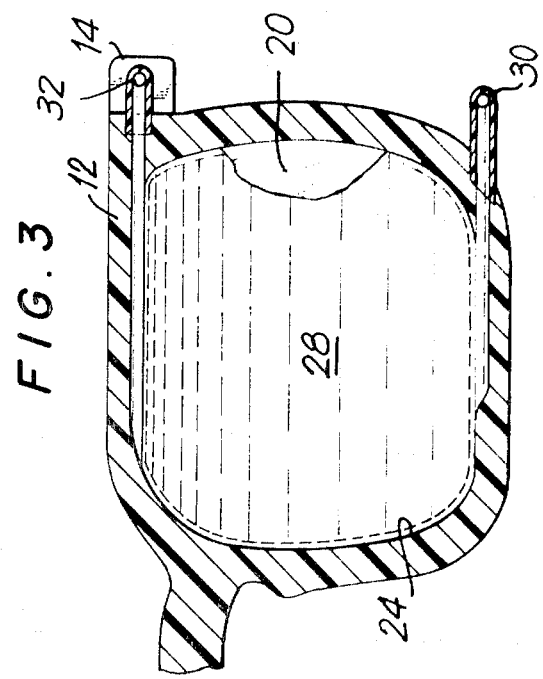

INVENTOR.
LEO MACKTA
BY
Lilling and Siegel
ATTORNEYS

FLUID BIFOCAL SPECTACLE

BACKGROUND OF THE INVENTION

This invention relates generally to spectacles, and specifically to bifocal spectacles having a first focal length suitable for reading or other close work and a second focal length suitable for distance vision.

Bifocal lenses are well know in the art and generally comprise a main or base lens of a focal length suitable for distance vision, and a small lens insert near the bottom of the base lens having a focal length suitable for close reading or other close vision. In a common alternative construction, an upper lens half is used for distance vision and a lower lens half for close work. In each of known constructions, only a portion of the total visual field is available for each respective type of vision, and accordingly for certain types of work, as for a person working at a desk, who must alternately look at papers on his desk and then look up to speak to people or walk to a filing cabinet.

In an effort to overcome the drawbacks of known bifocal construction, it has been proposed to provide spectacles in which a composite lens is used for each eye comprising at least two lens elements disposed forwardly and rearwardly with a space defining a fluid compartment therebetween. When this fluid compartment is empty, the composite lens has a focal length suitable for distance vision; fluid means are provided for filling the fluid compartment with a substantially clear and transparent refractive fluid to thereby yield a composite lens having a second focal length suitable for reading.

In this manner, it will be seen that when the fluid compartment is empty, the entire visual range of the spectacle may be utilized for distance vision and when the fluid compartment is filled, the entire visual range may be used for close work. However, a primary disadvantage of such composite bifocal constructions has been that they require complicated manipulation to achieve alternate filling and emptying of the fluid compartment between the individual lens element of each composite lens. One such variable bifocal construction utilizing a fluid medium is, for example, shown U.S. S. Pat. No. 2,437,642, to Francois Henroteau, issued Mar. 9, 1948 and entitled "spectacles." In this patent, a fluid reservoir is provided in a rotatable ring surrounding the lens so that the ring may be rotated to alternately fill the fluid space between the lens elements, or to empty the fluid back into the fluid reservoir. It is clear that, due to the particular manipulation of the lens elements, such a construction has not been entirely successful in providing a desireable bifocal spectacle which is simple to use and requires a minimum of attention.

SUMMARY OF THE INVENTION

With the above background in mind, it is therefore an object of this invention to provide a bifocal spectacle in which the full visual range thereof may be used alternatively and selectively for either distance vision or reading or other close work.

Specifically, it is a primary object of the present invention to provide a bifocal spectacle in which a composite lens is provided for each eye, the composite lens including at least two lens elements with a fluid space or compartment therebetween, the fluid space being selectively fillable with a suitable refractive fluid medium to change the focal length of the lens.

It is yet a further object of the present invention to provide such a bifocal spectacle in which the filling and emptying of the fluid compartment between lens elements is achieved automatically responsive to the position of the spectacles on the wearer's head, without the need for manipulation of same by the wearer.

These, as well as other objects which will become apparent as the description proceeds, are fulfilled by the provision of the inventive spectacle, characterized by a composite lens having at least two lens elements for each eye, defining therebetween a fluid compartment for receiving a refractive fluid, whereby the lenses will have a first focal length when the fluid compartment is filled with fluid and a second focal length when the fluid compartment is emptied. Fluid reservoir means are provided in communication with the compartment in such manner that the fluid will automatically flow from the reservoir to the compartment under the influence of gravity when the spectacle is tilted downwardly and forwardly, as for close reading, and will return to the reservoir when the spectacle is returned to a normal, substantially horizontal position.

BRIEF DESCRIPTION OF THE DRAWINGS

The invention itself will be better understood and additional advantages and features thereof will become apparent from the following detailed description of the preferred embodiment of the invention and two alternative embodiments, taken in conjunction with the accompanying drawings in which:

FIG. 1 is a side elevational view, partially in section, of a first preferred embodiment of the inventive spectacle, showing the fluid compartment emptied for use in distance vision;

FIG. 2 is a side view similar to FIG. 1, showing the spectacle tilted forwardly and the fluid compartment filled for use in close work;

FIG. 3 is a front vertical sectional view of a single lens of the spectacle of FIG. 2, taken along lines 3—3 of FIG. 2;

FIG. 4 is a side sectional view of a modified embodiment of the inventive spectacle;

FIG. 5 is a front sectional view of the spectacle of FIG. 4, taken along lines 5—5 of FIG. 4;

DETAILED DESCRIPTION OF THE INVENTION

Figure 6:
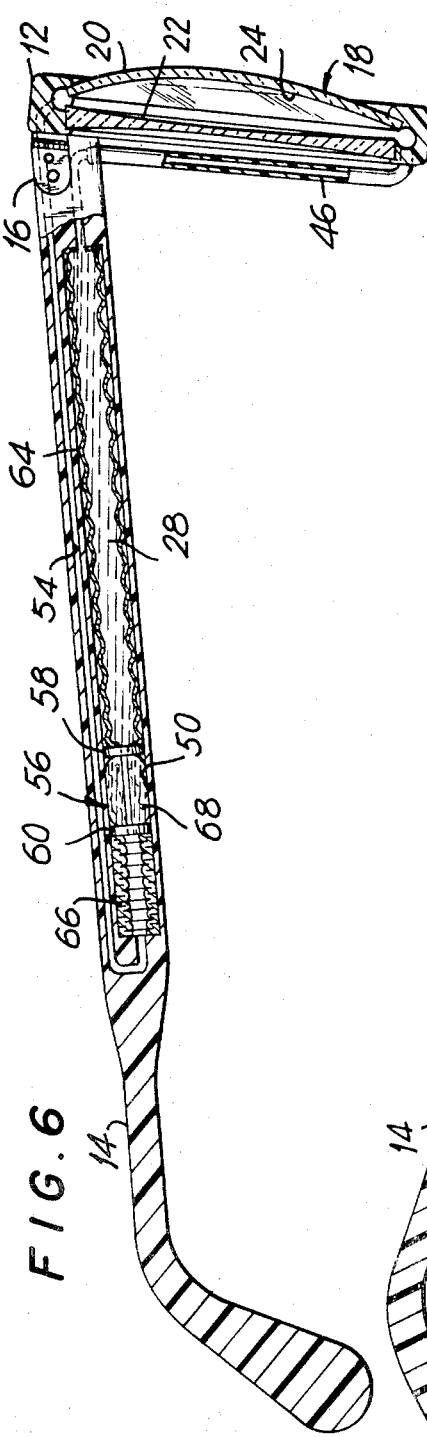
FIG. 6 is a side vertical sectional view of a further modified embodiment of the inventive spectacle, showing the fluid compartment emptied for distance vision.

Referring now to the drawings, and particularly to FIGS. 1 and 2, there is shown a bifocal spectacle generally designated as 10 constructed according to the present invention, and comprising a frame member 12 and at least one temple piece 14, secured to each other by any suitable means such as a conventional hinge member 16. A composite lens designated generally as 18 is mounted by any suitable means within the frame member 12 and 5 and comprises a first or forward lens element 20 and a second or rearward lens element 22 spaced therefrom, defining a fluid-receiving space or compartment 24 therebetween. The forward and rearward lens elements 20 and 22 are selected so as to have a composite focal length, when the fluid compartment 24 is empty, suitable for distance vision.

Means are provided for supplying a refractive fluid to the fluid compartment 24 under the influence of gravity when the spectacles are tilted forwardly. Preferably, the fluid-supplying means may comprise a fluid compartment 26 located to the rear of and slightly below the lower portion of the compound lens 18. The fluid reservoir may have any suitable configuration and preferably has an internal volume approximately equal to that of the fluid compartment 24, and is normally substantially filled with a suitable refractive fluid 28 which, when introduced into and filling the fluid compartment 24, will lend to the composite lens 18 a modified focal length suitable for use in reading or other close vision. For this purpose, the refractive fluid 28 may preferably comprise a silicone liquid of low viscosity which is not toxic to the eye if an accident should break the spectacles and cause leakage of the fluid 28 therefrom. The lower portion of the reservoir 26 communicates with the lower portion of the fluid chamber 24 by means of any suitable fluid communication means such as a small diameter fluid conduit or pipe 30, which is shown as formed integrally with the reservoir 26 but may be obviously be formed as a separate element communicating therewith.

Additionally, vent means are shown communicating the upper portion of reservoir 26 with the upper portion of the fluid compartment 24, which vent means may preferably comprise a vent passageway formed within one of the temple pieces 14, and communicating with a vent tube or the like 36 which extends generally upwardly from and opening into the top of the fluid reservoir 26. As shown in FIG. 1, the fluid reservoir 26 is so located the when the spectacles 10 are in a substantially horizontal position, as is normal for distance viewing, the upper level 38 of the fluid 28 will be adjacent the bottom of the fluid compartment 24, so that this compartment 24 is substantially empty and the composite lens 18 has a first focal length suitable for distance vision. When the spectacles are tilted downwardly, as shown in FIG. 2, the fluid 28 will flow through the fluid tube 30 and, in seeking its own level, will substantially fill the fluid compartment 24 so as to lend to the composite lens 18 a second focal length suitable for close vision. In this manner, it will be appreciated that the focal length of the composite lens will automatically be changed responsive to the tilting position of the spectacles, without the need of any manual manipulation of the lenses to achieve this change in focal length.

In some situations, it is not desirable to have the fluid reservoir and the fluid communication means in such a conspicuous locations as that shown in FIGS. 1 through 3, and in such situations, a syphon-type fluid-communication system may be provided for the spectacle, as shown in FIGS. 4 and 5. In these figures, elements corresponding to those shown in the construction of FIGS. 1 through 3 are indicated with like reference numerals, and generally include a conventional frame 12, temple piece 14, and hinge member or the like 16 as previously described. Additionally, in a manner previously described, a composite lens 18 comprises a first or forward lens element 20 and a second or rearward lens element 22 defining a fluid compartment 24 therebetween. In the embodiment according to these figures, the earpiece 40 of the spectacles is enlarged and has an internal chamber or reservoir 42 which reservoir performs the same function as the fluid reservoir 26 shown in FIG. 1. A fluid passageway 44 is provided within and generally longitudinally of the temple piece 14, and includes a first dip tube 46 at the forward end thereof communicating with the lower end of the fluid compartment 24, and a second dip tube 48 communicating with the rearward end thereof and extending downwardly through the fluid reservoir 42 and communicating therewith adjacent the bottom of said reservoir, as shown. Additionally, a vent passageway 32 provides vent communication means for allowing the passage of air between the upper portion of the fluid compartment 24 and the upper portion of the fluid reservoir 42, in substantially the same manner as the vent passageway 32 shown in FIG. 1. The fluid passageway 44, including dip tubes 46 and 48, is maintained filled with fluid 28, and thus acts as a syphon between the reservoir 28 and the fluid compartment 24, so that forward tilting of the spectacles will result in the fluid being transferred to and filling the fluid compartment 24 in the same manner as previously described above with reference to FIG. 1, and the fluid will likewise drain back into the fluid reservoir 42 when the spectacles are raised to a substantially horizontal position. Thus, in the same manner as described above, two different focal lengths are achieved, depending upon the position of the spectacles; the primary advantage of this particular embodiment is that the fluid passageways are entirely contained within the temple pieces and are thus hidden from view.

Figure 7:
FIG. 7 is a side view similar to FIG. 6 showing the fluid compartment filled for close work.
Figure 8:
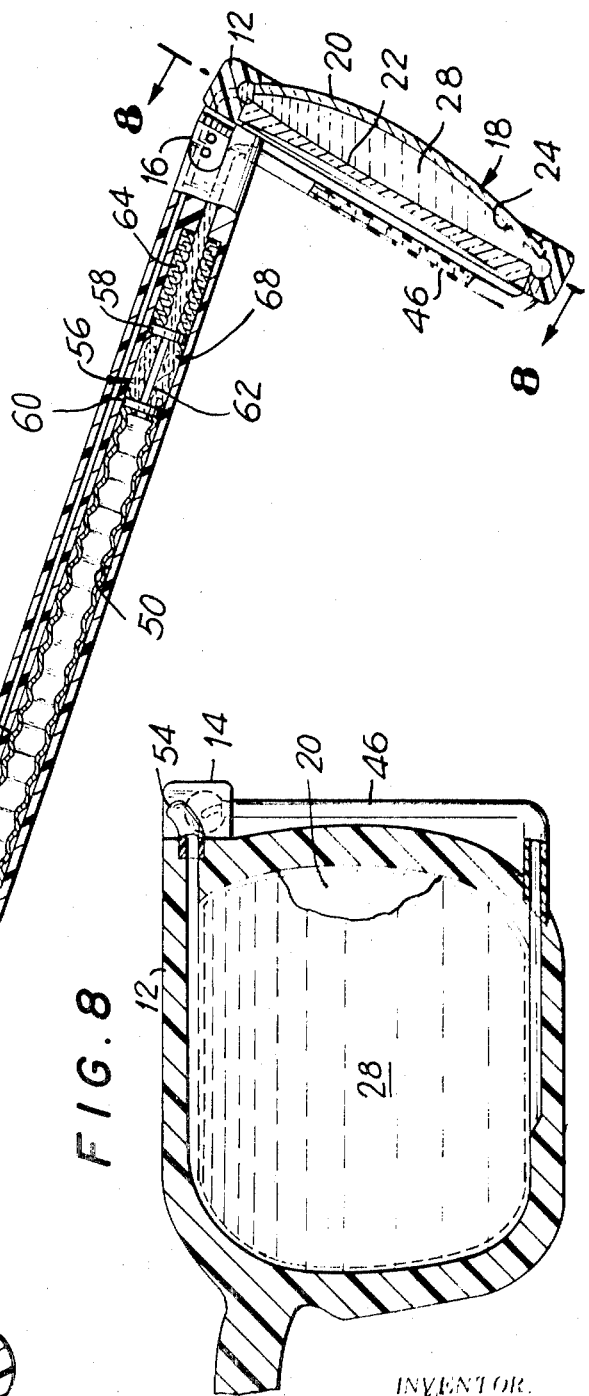
FIG. 8 is a front vertical sectional view through a single lens of the spectacle of FIG. 7, taken along lines 8—8 of FIG. 7.

In FIGS. 6 through 8 there is illustrated a further embodiment of the inventive spectacles, wherein gravity-responsive piston means are provided for ensuring a positive flow of the refractive fluid to the fluid compartment within the composite lens. Again, this embodiment. elements similar to those previously described with reference to FIG. 1 are given like reference numerals, and include a frame 12, a temple piece 14 secured to the frame as by a hinge member 16, and forward and rearward lens elements 20 and 22, respectively, forming a composite lens 18 and defining a fluid compartment 24 therebetween. IN this embodiment an elongated bore or tubular passageway 50 is provided within the temple piece 14 and communicates at its forward end with the fluid compartment 24 adjacent its lower end by means of a first tube or conduit 52; the rear end of the tubular passageway 50 communicates with the fluid compartment 24 adjacent its upper end by means of a vent passageway 54 within the temple piece 14, extending generally parallel to the tubular passageway 50. A piston means generally designated as 56 is provided for free axial movement within the tubular passageway 50, which piston means comprises a first or forward piston member 58 and a second or rearward piston member 60 spaced a short distance therefrom, the first and second piston members being secured to each other by axially extending rod member 62, as shown. A first or forward bellows member 64 is secured to and extends between the first or forward piston member 58 and the forward end of the tubular passage 50, and a similar second rearward collapsible bellows member 66 is secured to and extends between the second or rear piston member 60 and the rear end of the tubular passageway 50. The first or forward bellows member 64, when in expanded condition as shown in FIG. 6, serves as a fluid reservoir for the refracting fluid 28, in the same manner as the reservoir previously described with reference to FIGS. 1 and 4. Preferably as shown the dimensions of the forward and rearward bellows member 64 and 66 and the length of the tubular passageway 50, are selected such that the forward bellows member 64 is substantially fully collapsed when the rearward bellows member 66 is fully expanded and vice versa.

It will be appreciated that 24 downward and forward tilting of the spectacles, the piston means 56 will slide forward and will compress and collapse the foreward bellows member 64, expelling the refracting liquid 28 therefrom and into the fluid compartment 24, thus giving to the composite lens 18 a focal length suitable for close reading as described above. While the position means 56 will respond by itself to the influence of gravity, it is preferable that a dense nonwetting liquid be inserted into the space between the first and second piston members 58 and 60, which dense liquid will enhance the response of the piston means of the influence of gravity, Specifically, the introduction of a mass 68 of mercury sufficient to substantially fill the fixed-volume space between the piston members 58 and 60, has proven to be particularly advantageous in this regard. As the spectacle is titled back to a normal, substantially horizontal position as shown in FIG, 6, the piston means 56 will slide rearwardly and will expand the forward bellows member 64, drawing the refractive fluid 28 back into the reservoir formed therein: the simultaneous compression of the rearward bellows member 66 will force the air therein out through the vent passageway 54 into the upper portion of the composite lens 18, thereby facilitating this return of the refracting fluid 28. Through the use of the piston means 56 and the mass 68 of mercury, the filling and emptying of the fluid compartment 24 with the refracting fluid 28 will be made considerably more sensitive to small tilting movements of the spectacles than can be achieved through the use of the two embodiments previously described.

By providing a bifocal spectacle having a composite lens defining a fluid chamber which can be selectively filled or emptied responsive to gravity, it will be appreciated that all the object set forth at the outset to this specifications have been successfully fulfilled. Accordingly,

What is claimed is:

1. A bifocal spectacle having at least one lens adapted to be selectively converted between two different lengths responsive to tilting movement of the spectacle comprising, in combination, a composite lens for at least one eye, comprising a forward lens element and a rearward lens element defining a fluid-receiving compartment therebetween; a fluid reservoir normally containing a refractive fluid when the spectacle is in substantially horizontal position; and fluid conduit means affording fluid communication between said reservoir and said compartment and adapted to effect flow of said refraction fluid under the influence of gravity from said reservoir to said compartment when the spectacle it titled downwardly and forwardly, and from said compartment back to said reservoir when the spectacle is returned to a substantially horizontal position; said fluid reservoir comprising a hollow chamber within the temple earpiece of the spectacle, said fluid conduit means comprising a tubular passageway within and extending along the temple piece and having a dip tube at one end extending into said fluid reservoir and opening thereto adjacent the bottom of said fluid reservoir, said fluid conduit means further including an extension at the other end connected to the bottom portion of the fluid-receiving compartment of said composite lens, air vent conduit means within and extending along the temple piece and being connected to the upper portions of said fluid reservoir and said fluid-receiving compartment, whereby the flow of said refractive fluid is effected by a syphon action.

2. A bifocal spectacle as defined in claim 1 wherein said refractve fluid comprises a nontoxic viscosity silicone liquid.